Figure 1:
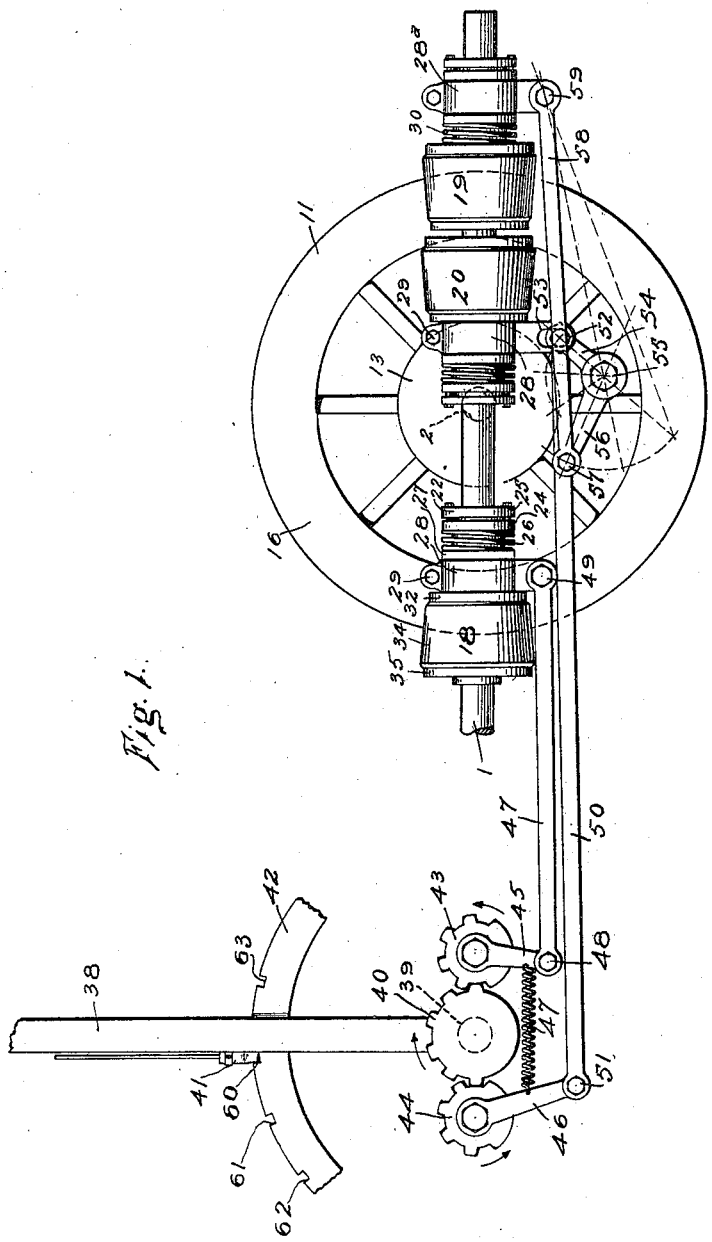

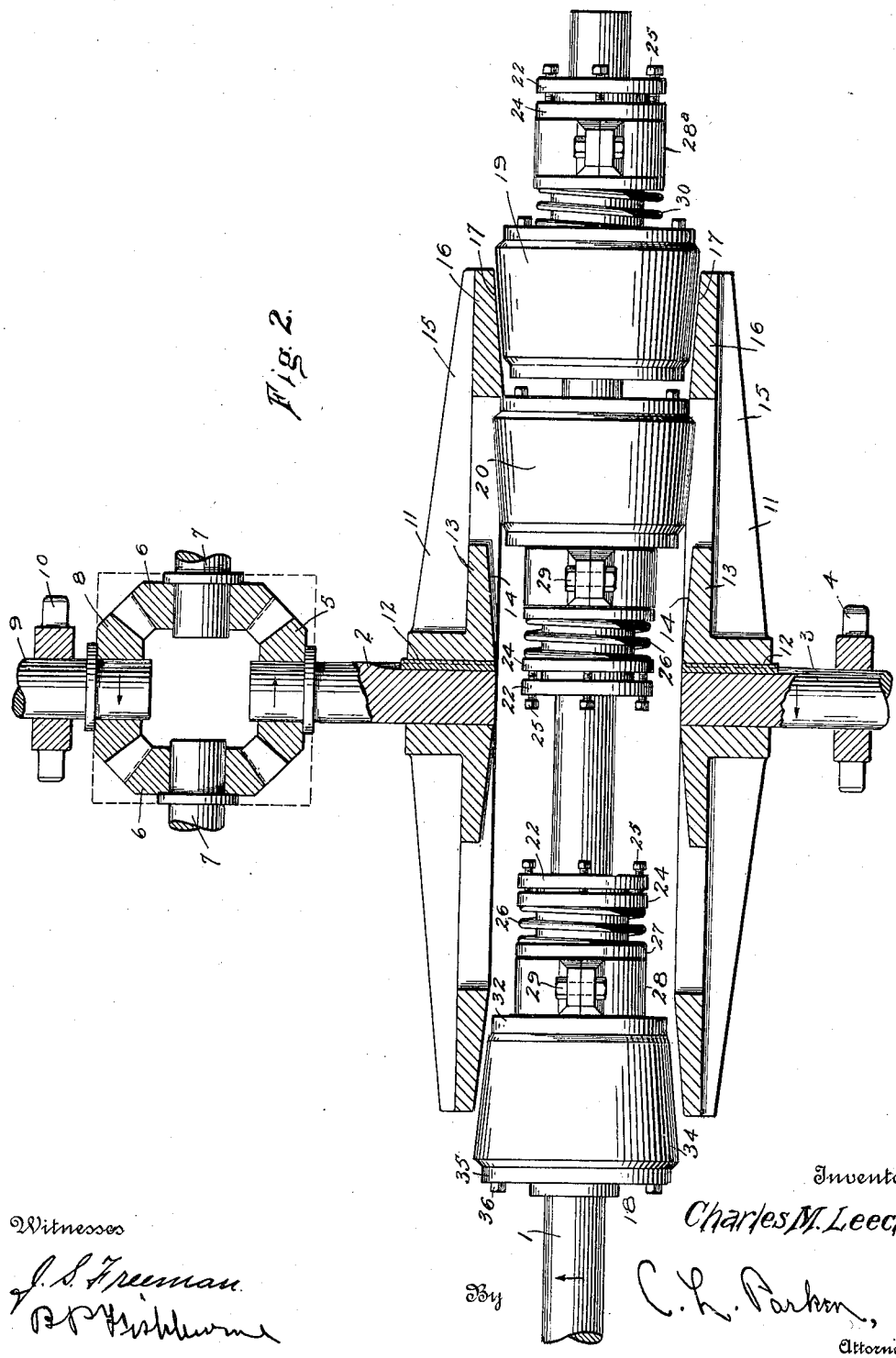

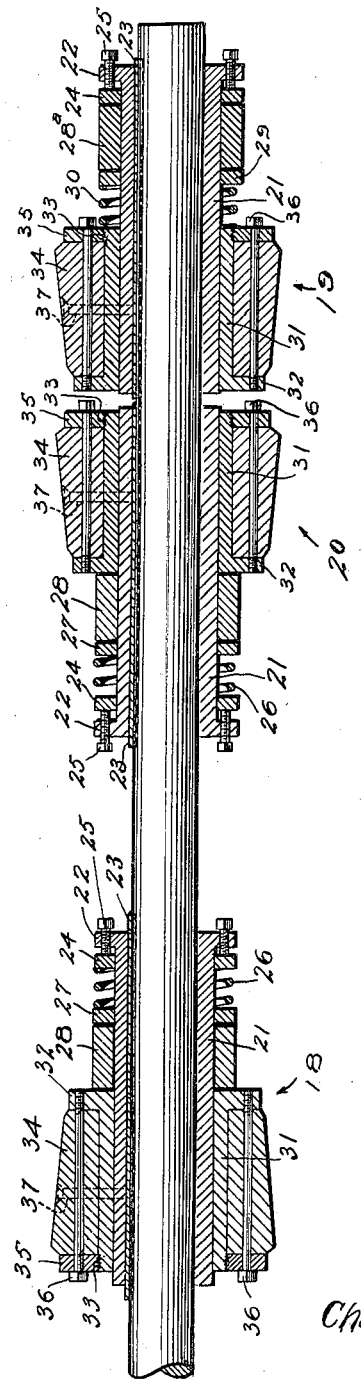

UNITED STATES PATENT OFFICE.

CHARLES M. LEECH, OF LIMA, OHIO.

TRANSMISSION-GEAR.

981,291.                 Specification of Letters Patent.      Patented Jan. 10, 1911.

Application filed December 18, 1909. Serial No. 533,790.

*To all whom it may concern:*

Be it known that I, CHARLES M. LEECH, citizen of the United States, residing at Lima, in the county of Allen and State of Ohio, have invented certain new and useful Improvements in Transmission - Gear, of which the following is a specification.

My invention relates particularly to power transmission mechanism for motor vehicles: and an important object of the same is to provide simplified mechanism of the character mentioned, by means of which danger from the loss of presence of mind on the part of the operator is reduced to a minimum.

A further object of my invention is to provide a power transmission embodying forward low speed and high speed transmission means and reverse transmission means, all of which are controlled by a single lever.

My invention consists generally of the arrangement and combination of parts to be hereinafter described.

In the accompanying drawings forming a part of this specification, and in which like numerals are employed to designate like parts throughout the same, Figure 1 is a side elevation of the device, parts of the same being removed, Fig. 2 is a plan view of the device, parts of the same being shown in section, and Fig. 3 is a horizontal sectional view through the friction pulleys.

In the drawings, wherein a preferred embodiment of my invention is illustrated, 1 designates the longitudinally arranged driving shaft of a vehicle, which is driven at its forward end by a suitable engine, (not shown). At right angles to the shaft 1 are arranged transverse shafts 2 and 3. The transverse shaft 3 is provided with a fixed sprocket wheel 4, whereby rotation may be imparted from the shaft 3 to the rear axle (not shown) of the vehicle. The transverse shaft 2 is provided at its outer end with a rigidly mounted bevel gear 5, which engages bevel gears 6 which are rigidly mounted upon rotatable shafts 7. The bevel gears 6 are disposed at right angles to the bevel gear 5 and mesh with the bevel gear 8 arranged opposing and parallel with said bevel gear 5. The bevel gear 8 is rigidly mounted upon a shaft 9, which is rotatable and provided with a fixed sprocket wheel 10, whereby rotation may be readily imparted from the same to the rear axle of the vehicle.

As shown by the arrows upon the shafts 2 and 9, the bevel gears above described cause the shafts 2 and 9 to rotate in opposite directions.

The shafts 2 and 3 are provided at their inner ends with friction wheels or disks 11, which are keyed to the transverse shafts 2 and 3 as at 12, or rigidly mounted upon the same by any suitable means. The friction disks 11 are arranged opposing each other, and the driving shaft 1 is arranged between the disks 11 in a horizontal position and in alinement with the centers of said disks 11. Each of the friction wheels 11 comprises a central circular section of material 13, having a beveled inner surface 14. Spokes 15 are formed upon the outer side of the section 13 and are connected at their outer ends by a ring-shaped section of material 16, which is provided with an inner beveled surface 17.

The driving shaft 1 is provided with reverse and forward low speed friction pulleys 18 and 19 respectively, which are adapted to engage the ring-shaped section 16 at diametrically opposite points. The reverse and forward low speed pulleys 18 and 19 are slidably mounted upon the shaft 1 and are adapted to alternately engage the sections 16 of the friction disks 11, in a manner to be hereinafter described. It is obvious that when either of the pulleys 18 or 19 is in engagement with the friction disks 11, that said disks will be rotated in opposite directions. Assuming that the driving shaft 1 is being rotated clock-wise as indicated by the arrow, transverse shaft 3 will be rotated clock-wise as indicated by the arrow and transverse shaft 2 will be rotated counter clock-wise. As above stated the shafts 2 and 9 rotate in opposite directions, therefore shaft 9 will be rotated clock-wise, whereby the sprocket wheels 4 and 10 rotate in the same direction for driving the rear axle of the vehicle. The shaft 1 is further provided with a forward high speed friction pulley 20 which is arranged between pulleys 18 and 19 and adapted to frictionally engage the circular section 13. The pulley 20 is slidably mounted upon the shaft 1, in a manner to be hereinafter described. Each of the pulleys 18, 19 and 20 comprises a tubular sleeve 21, having a flanged end 22. Each of the sleeves 21 is prevented from rotating upon the shaft 1 by means of a key 23, and said sleeve 21 is capable of being moved longitudinally of said shaft 1. Upon each of the sleeves 21 near flanged end 22 is arranged a ring 24 which is longitudinally movable upon the sleeve 21, and which is adjusted by means of screws 25 tapped through the flange 22. A coil spring 26 is arranged around a portion of the sleeve 21 of each of the pulleys 18 and 20, and is compressed between the ring 24 and a second ring 27, which is capable of moving longitudinally upon the sleeve 21. A yoke 28 is loosely mounted upon each of the collars 21 of the friction pulleys 18 and 20 in engagement with the rings 27, and the sides of the yokes 28 are held together by means of bolts 29, as illustrated in Fig. 2. A yoke 28ᵃ is loosely mounted upon the sleeve 21 of the pulley 19 in engagement with the ring 24, and in engagement with a second ring 29′ which is loosely mounted upon the sleeve 21. The ring 29′ engages a compressed coil spring 30, as clearly illustrated in Fig. 3. Upon each of the sleeves 21 is arranged a collar 31 having one end thereof flanged as at 32 and the opposite end externally screw-threaded as at 33. Upon each of the collars 31 is arranged a beveled ring-shaped member 34, which forms the periphery of the pulley, and which may be formed of any suitable material. Each of the ring-shaped members 34 is held in place by means of a ring-shaped plate 35, which is internally screw-threaded for engagement with the screw-threaded end 33 of the collar 31. Each of the ring-shaped plates 35 is provided with a plurality of apertures through which are arranged bolts 36 which pass through the ring-shaped member 33 and have their free ends screw-threaded into the flange 32. The ring-shaped member 33 is thus securely held upon the collar 31 and is prevented from accidental displacement. Each of the collars 31 is rigidly secured upon the sleeve 21 by means of a bolt 37 which passes through the ring-shaped member 33, collar 31, and has its inner end rigidly connected to the sleeve 21. By this construction it is obvious that the ring-shaped member 33 of each of the friction pulleys is rigidly locked to the sleeve 21, which in turn is rotated by the shaft 1, and is capable of moving longitudinally upon the same.

I provide a lever 38 which is rigidly mounted at its lower end on a shaft 39 upon which is rigidly mounted a stripped gear wheel 40, provided with gear teeth upon the upper portion thereof. The lever 38 has associated therewith a latch device 41, which is adapted to coöperate with a segmental rack 42 as illustrated in Fig. 1. The gear wheel 40 meshes with stripped gear wheels 43 and 44 which are arranged upon opposite sides of the same, and which are provided with levers 45 and 46 respectively, rigidly secured thereto.

The levers 45 and 46 are connected by a retractile coil spring 47 which tends to draw the levers 45 and 46 toward each other for returning lever 38 to its vertical position. A connecting rod 47 is pivotally connected to the free end of the lever 45 as at 48 and is connected at its opposite end to the yoke 28 of the pulley 18 as at 49. A connecting rod 50 is pivotally connected to the free end of lever 46 as at 51 and is pivotally connected to the outer side of the yoke 28 of the forward high speed pulley 20, by means of a bolt 52 which is arranged within a longitudinal opening 53 upon the lower portion of the yoke 28. The bolt 52 passes through one arm of a bell-crank lever 54 which is pivotally mounted as at 55, and the opposite arm 56 of the bell-crank lever is pivotally connected as at 57 to a connecting rod 58 which has its rear end pivotally connected as at 59 to the yoke 28ᵃ of the forward low speed pulley 19.

In the operation of my device, when lever 38 is arranged in its vertical position, so that the latch device 41 engages the neutral notch 60 of the segmental rack 42, rotation from the shaft 1 will not be imparted to the friction disks 11 and the vehicle to which my device may be applied, will accordingly be at rest. If it is desired to drive the vehicle forwardly at low speed the lever 38 is swung forwardly until the latch device 41 engages the low speed notch 61. This forward oscillation of the lever 38 will cause the gear wheel 39 to be rotated counter clock-wise, which will in turn rotate the gears 43 and 44 clock-wise. The gear 43 will then draw the reverse friction pulley 18 out of engagement with the disks 11, and lever 46 by means of connecting rod 50 will draw forward high speed pulley 20 toward the circular section 13. At the same time connecting rod 50 will oscillate bell-crank lever 54, whereby connecting rod 58 will move forward low speed friction pulley 19 in engagement with the outer ring-shaped sections 16 of the disks 11. It is obvious by reference to Fig. 2 that the pulley 19 engages the disks 11 before the pulley 20, could reach the circular section 13, for the pulley 20 is to travel a much greater distance for engagement with the section 13 than does pulley 19 travel to engage the section 16. If it is desired to use the high speed, the lever 38 is oscillated forwardly until the latch device engages the notch 62. By this movement the reverse pulley 18 will be drawn farther away from the disks 11, while lever 46 by means of connecting rod 50 will draw forward high speed pulley 20 into engagement with the high speed section 13. The connecting rod 50 also actuates the bell-crank lever 54 which will move connecting rod 58 forwardly until the arm 56 of the bell-crank lever has reached its most forward point of travel, when arm 56 will begin to move rearwardly thereby forcing connecting rod 58 rearwardly and disengaging forward low speed pulley 19 from the friction disks. When it is desired to reverse, or to drive the vehicle backward, lever 38 is oscillated rearwardly until its latch device 41 engages the reverse notch 63. This movement of lever 38 causes pinion 39 to be rotated clock-wise which will rotate pinions 43 and 44 counter clock-wise, as shown by the arrows below the same. Lever 45 by means of connecting rod 47 will then force the reverse pinion 18 into engagement with the friction disks 11 and lever 46 will simultaneously move high speed pulley 20 rearwardly away from the section 13. Connecting rod 50 now swings bell-crank lever 54 rearwardly which causes connecting rod 58 to travel therewith, whereby forward low speed pulley 19 is disengaged from the disks 11. It is worthy of note that the pulleys 18, 19 and 20 are urged into their operative positions with the disks 11, by the yokes 28 and 28ª respectively, which press against the coil springs surrounding the sleeves 21. It will thus be seen that by this construction the starting of the friction disks 11 will be made more even, and that sudden jerks or starts of the same will be done away with.

Having fully described my invention I claim:

1. The combination with a driving shaft, of a transverse driven shaft, a friction disk rigidly mounted upon said driven shaft, reverse and forward low speed friction pulleys keyed upon said driving shaft for engagement with said friction disk near the periphery thereof, a forward high speed friction pulley keyed upon said driving shaft for engagement with said friction disk near its center, a lever for controlling the longitudinal movement of said pulleys upon said driving shaft, connecting means between said lever and said pulleys including a bell-crank lever, said bell-crank lever being actuated by another of said pulleys when the same is moved longitudinally, and connecting rods for moving the other of said pulleys.

2. The combination with a driving shaft, of a transverse driven shaft, a friction disk rigidly mounted upon said driven shaft, reverse, forward low speed and forward high speed pulleys keyed upon said driving shaft for engagement with said friction disk, a single controlling lever for moving said pulleys into and out of engagement with said friction disk, gear wheels rotatably mounted near said controlling lever, a gear wheel rigidly connected to said controlling lever and in engagement with said first named gear wheels, a lever rigidly connected to each of said first named gear wheels, a connecting rod pivotally connected to one of said levers and said reverse pulley, a connecting rod pivotally connected to the other of said levers and to said forward high speed pulley, a bell-crank lever pivotally connected to said high speed pulley, and a connecting rod pivotally connected to said bell-crank lever and to said forward low speed pulley.

3. The combination with a driving shaft, of a driven shaft and a friction disk rigidly mounted thereon, friction pulleys keyed upon said driving shaft and adapted to be moved into and out of engagement with said friction disk, a yoke loosely mounted upon a portion of each of said pulleys, a spring against which said yoke acts when moving said pulley into engagement with said fricton disk, a single lever for controlling said pulleys, and connecting means between said lever and said pulleys, comprising a bell-crank lever.

4. In a device for controlling a plurality of gears, a controlling lever, a bell-crank lever, connecting means between said bell-crank lever and two of said gears, connecting means between said bell-crank lever and said controlling lever, and connecting means between said controlling lever and the remaining one of said plurality of gears.

5. In a device for controlling a plurality of gears, a controlling lever, connecting means between said controlling lever and two of said gears, capable of initially moving the two gears in the same direction and then in opposite directions, and connecting means between said controlling lever and the remaining gear.

6. In a device of the character described, a driven member, gears arranged to engage said driven member to rotate the same at different rates of speed, and a device connected to said gears to initially move the same in one direction and then in opposite directions.

7. In a device of the character described, a driving shaft, a rotary disk, gears keyed upon the driving shaft for alternately engaging the disk, a device connected to both of said gears for initially moving the same in one direction and then in opposite directions, and means for actuating said device.

8. In a device of the character described, a driven disk, gears arranged to alternately engage the same to rotate said disk at different rates of speed, and a bell-crank-lever connected to the gears to initially move the same in one direction and then in opposite directions.

In testimony whereof I affix my signature in presence of two witnesses,

CHARLES M. LEECH.

Witnesses:
 NELLIE HOOVER,
 F. C. DALZELL.